Aug. 19, 1969 H. O. BANKS ETAL 3,461,954

ACTIVE HEAT TRANSFER DEVICE

Filed May 29, 1967 2 Sheets-Sheet 1

Hampden O. Banks,
Richard H. Sparks,
INVENTORS.
BY.
Edward Dugas
AGENT.

Aug. 19, 1969 H. O. BANKS ETAL 3,461,954

ACTIVE HEAT TRANSFER DEVICE

Filed May 29, 1967 2 Sheets-Sheet 2

Hampden O. Banks,
Richard H. Sparks,
INVENTORS.
BY.
Edward Dugas
AGENT.

United States Patent Office 3,461,954

Patented Aug. 19, 1969

3,461,954

ACTIVE HEAT TRANSFER DEVICE

Hampden O. Banks and Richard H. Sparks, Westminster, Calif., assignors to TRW Inc., Redondo Beach, Calif., a corporation of Ohio Filed May 29, 1967, Ser. No. 642,098
Int. Cl. G05d *23/10;* F28f *13/00*
U.S. Cl. 165—32 5 Claims

ABSTRACT OF THE DISCLOSURE

A continuous heat source transfers heat to a desired device such as a battery. A plurality of bimetallic, heat-activated transfer switches transfer or bleed away heat from the heat source to a heat sink in a controlled manner. This makes it possible to maintain the temperature of the battery within predetermined levels.

Background of the invention

This invention pertains to the field of temperature controlled devices and, more particularly, the invention is concerned with active heat transfer means for controlling the temperature of a desired device which is being heated by means of a substantially constant heat source to within predetermined levels. Various types of heat transfer devices exist in the prior art for dissipating heat from electronic equipment and the like by means of bi-metallic couples which depend upon the phenomenon of dissimilar linear expansion coefficients which are activated when the temperature of the equipment rises above a predetermined level. One such prior art device is disclosed in U.S. Patent 2,949,283, entitled "Apparatus for Heat Transfer" by M. F. Smith. In that patent, a plurality of bi-metallic strips are fastened to one end of a base or plate member which is in thermal contact with the equipment to be cooled. The free end of each metallic strip is free to move toward or away from the base or plate member, depending upon the temperature of the base, as reflected in the elements. As the temperature of the base roses, the bi-metallic strips bend or loop outwardly to be exposed to air currents that are created by a fan. They thus draw heat from the base and equipment to prevent the equipment from reaching a critical temperature level. In another embodiment disclosed in that patent application, the bi-metallic elements are positioned so that they intersect the surface of a heat sink, such as a cooling water tank, and by conduction dissipate heat to the water, while at the same time they are cooled with air currents. One of the distinct disadvantages of the last named embodiment is that the surface area of the bi-metallic strip contacting the water-cooled sink is very small; therefore, the amount of heat that may be dissipated through the bi-metallic elements to the water is very small. Also, for items such as batteries which are utilized in space missions, it is necessary to maintain their operating temperature within predetermined levels. This necessitates that a heat source of some type be used to provide the necessary heat in a low temperature environment to maintain the temperature of the battery at least at a minimum operating level. In certain applications, therefore, it is necessary to maintain the temperature of the particular device that is being activated within predetermined limits, both as to maximum temperature and as to minimum temperature. The aforementioned Smith patent is concerned only with the maximum temperature of equipment.

Another prior art device is disclosed in U.S. Patent No. 2,782,782, entitled "Heat Regulated Cooking Vessel" by A. R. Taylor. In that patent, a cooking vessel is constructed with a double bottom, one movable relative to the other, and by placing bi-metallic elements between the inner and outer bottoms, the position of the inner bottom is moved away from the fixed bottom so as to increase the heat path to the inner bottom and thereby partially control the temperature of the inner bottom. The range of heat control possible with this particular apparatus is severely limited, due to the fact that the inner bottom is not connected to a heat sink which would allow for rapid dissipation of heat. In light of the prior art, a device for maintaining the temperature of a desired article or device within a predetermined range would therefore be highly desirable.

Summary of the invention

In a preferred embodiment of the invention, the problems defined above are efficiently solved by utilizing a continuous heat source, such as an isotope heat source, which is contained in a base plate provided with a bi-metallic activated heat transfer switch means providing a variable heat path to a heat sink in a controlled manner so as to maintain the temperature of the device within predetermined levels. In a second embodiment of the present invention, a plurality of bi-metallic activated heat transfer switch means, each having a predetermined temperature level at which they are activated, maintain the temperature of the desired device at a uniform level.

Accordingly, it is an object of the present invention to provide a novel apparatus for maintaining the temperature of a device within predetermined limits.

It is a further object of the present invention to provide an apparatus for maintaining the temperature uniform within a device.

It is a further object of the present invention to provide a continuous heat source for a device and a heat transfer means for maintaining the temperature of the device within predetermined limits.

The aforementioned and other objects of the present invention will become more apparent when taken in conjunction with the following description and drawings, throughout which like characters indicate like parts, and which drawings form a part of this application.

Description of the preferred embodiment

Figure 1:
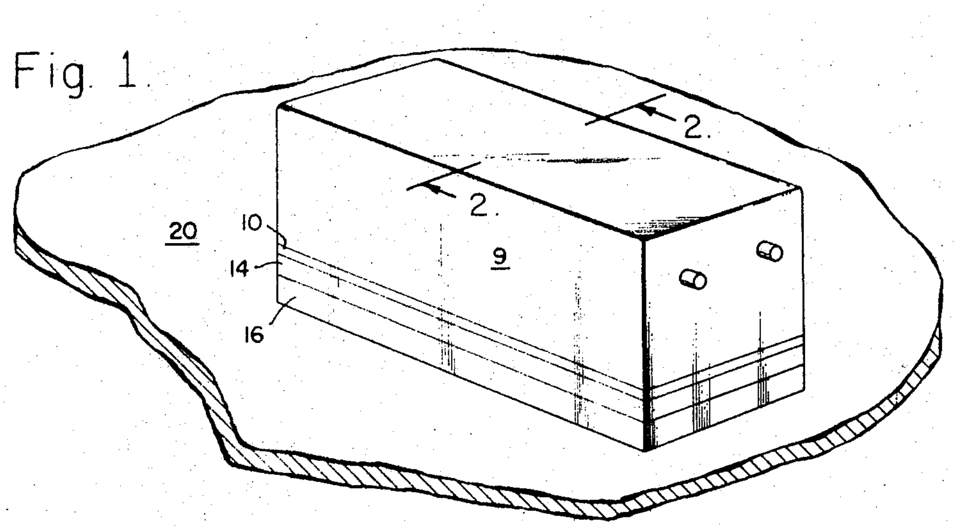
FIGURE 1 illustrates a perspective view of the preferred embodiment of the invention.

Referring to FIGURE 1, a heat sink 20, such as the frame of a spacecraft, has fixed to its surface a plurality of batteries (not visible in this figure), which are housed in insulating material 9 which is attached to a base plate comprised of plate members 10 and 14 which are thermally insulated from the heat sink 20 by means of standoff insulators 16.

Figure 2:
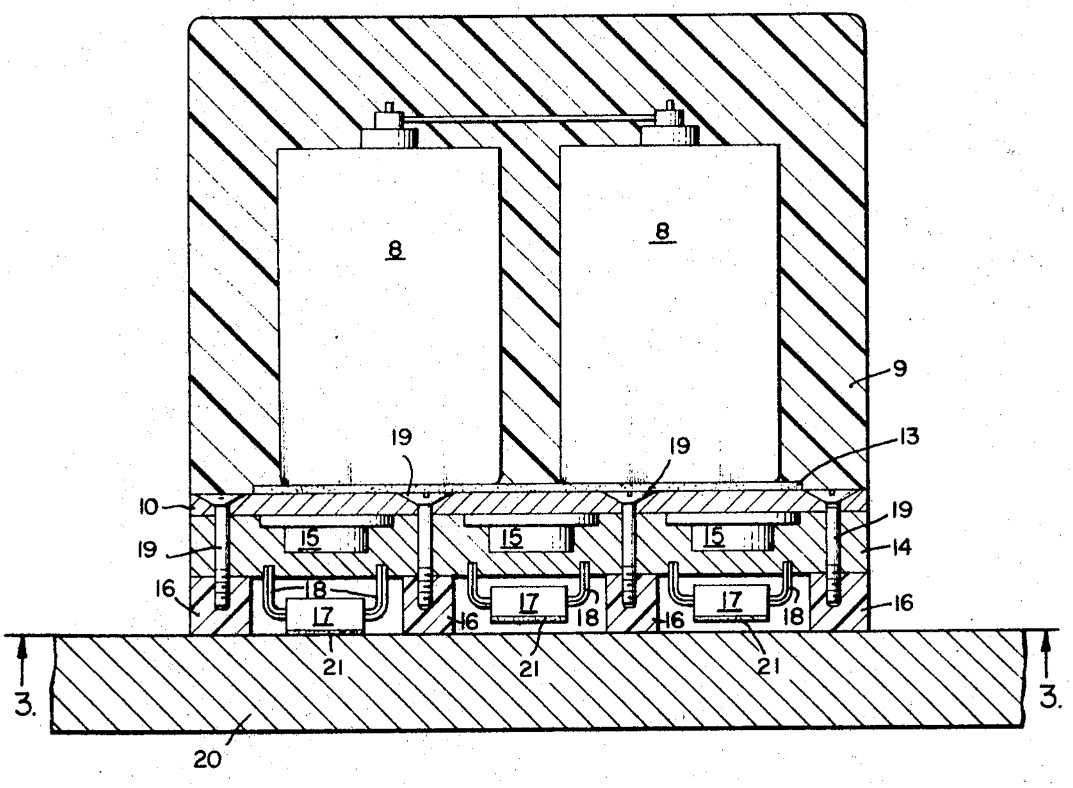
FIGURE 2 illustrates a sectioned view of the embodiment of FIGURE 1, taken along the sectioning lines 2—2.

Referring now to FIGURE 2, which is a sectioned view of FIGURE 1 taken along the section lines 2—2, the batteries 8 are positioned on the base plate member 10 in thermal contact with the base plate member. To ensure and improve thermal contact, a thermally conducting grease 13, such as RTV–11 silicone grease, is applied between the battery and the base plate member. A housing of thermally insulating material 9 covers the batteries 8 in order to minimize the escape of heat from the batteries except through the base plate member 10. Isotope heaters 15 are positioned in desired locations on the underside of the base plate member 10 so as to provide heating of a continuous nature to the batteries 8. A second plate member 14 made from aluminum or other good thermal conductor sandwiches the isotope heaters 15 to the base plate member 10, ensuring thermal contact and structural rigidity. The base plate comprised of plates 10 and 14 are supported in a fixed relationship with respect to the heat sink 20 by means of thermal insulators 16 and mounting screws 19 which affix the base plate to the thermal insulators. The thermal insulators 16 are in turn fixedly attached to the heat sink 20. Bi-metallic elements 18 are positioned in pairs on either side of a thermal contact member 17, which may be a rectangular or disc shaped plate of aluminum, the contact surface of which is coated with a thin film of thermally conducting grease 21.

In operation, the entire assembly is subject to a hostile environment with respect to the operating point of the batteries 8. The isotope heat sources 15 provide a continuous source of heat to the base plate 10. The temperature of the batteries can rise because of the heat energy being emanated by the isotope heat source, and because of self-heating caused by the energy drain from and/or controlled overcharge of the batteries. A portion of the heat generated by the heat sources flows to the bi-metallic elements 18 and if this heat exceeds a predetermined value, the bi-metallic elements expand to a point where the thermal contactor 17 makes contact with the heat sink 20, thereby bleeding-off a portion of the heat that would normally flow towards the batteries. By correct choice of bi-metallic elements 18 with known coefficients of linear expansion of the bi-metallic elements 18, it is possible to regulate the temperature of the batteries to within a predetermined maximum range which is defined by the level of the temperature of the heat from the isotope sources, and on the minimum end by the temperature of the heat sink 20.

Figure 3:
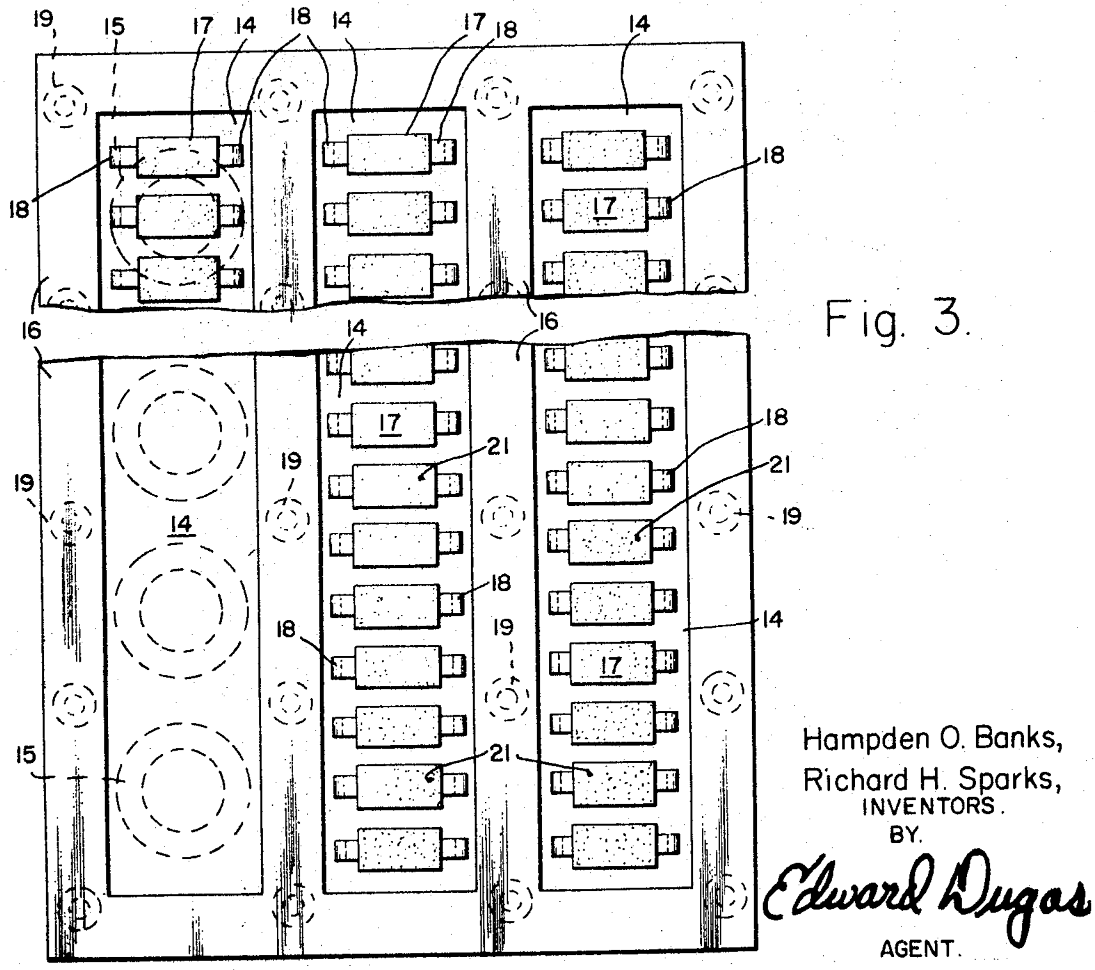
FIGURE 3 is a sectioned view of the embodiment illustrated in FIGURE 1, taken along the sectioning lines 3—3 of FIGURE 2.

In FIGURE 3, the thermal contacts 17 are shown positioned in a matrix array so as to provide thermal contact where needed. In other words, if a hot spot develops at one corner or in the center of the base plate, these thermal contactors in that area will be forced into contact with the heat sink due to the expansion of their bi-metallic elements. This variable contact feature provides a uniform heat distribution capability for the base plate. It is also possible to vary the expansion coefficient for adjacent pairs of thermal contacts so that alternate or adjacent pairs of contacts close at different temperature levels, thereby providing increased thermal contact for the base plate as the temperature rises to increase levels.

In summary, this invention provides thermal control while utilizing a continuous internal heat source to control the temperature of a battery of other desired device within a predetermined temperature range.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as fall within the true scope of the invention.

What is claimed is:

1. An active temperature regulator for maintaining the temperature of a device within preselected limits comprising:

(a) a device, the temperature of which is to be maintained within preselected limits;

(b) a base plate in thermal contact with said device;

(c) a source of continuous heat in thermal contact with said base plate and supplying heat to said device through said base plate, said source maintaining the temperature of said device above a preselected level;

(d) a heat sink; and (e) a plurality of thermal contactors, each having a bimetallic element connected between said base plate and its associated thermal contactor to force said thermal contactor in contact with said heat sink when the temperature of the base plate rises above a predetermined level, there being groups of said thermal contactors, each group responding to a different temperature at which they make contact with said heat sink.

2. An active temperature regulator for maintaining the temperature of a device within predetermined limits even when the ambient temperature is substantially below said predetermined limits, comprising:

(a) a device, the temperature of which is to be maintained within predetermined limits;

(b) a thermally conductive base plate in thermal contact with said device;

(c) a source of continuous heat in thermal contact with said base plate for supplying heat to said device through said base plate, said heat source having a thermal capacity sufficient for maintaining the temperture of said device above a preselected level;

(d) a heat sink spaced from said base plate; and (e) bimetallic, thermally-conductive means for selectively providing a thermally conductive heat path between said base plate and said heat sink in response to the temperature of said base plate rising above a predetermined temperature.

3. A temperature regulator as defined in claim 2 wherein said heat source is an isotope heater.

4. A temperature regulator as defined in claim 2 wherein said device is a battery, and further including thermal insulation surrounding said battery to minimize radiation heat loss from said battery.

5. A temperature regular as defined in claim 2 wherein said device is a battery having an extended area and wherein said thermally-conductive means consists of an array of thermal contactors, each contactor having a bimetallic element connected between said base plate and its associated thermal contactor to force said contactor in contact with said heat sink when the temperature of said base plate rises above a predetermined level

References Cited

UNITED STATES PATENTS

| | | | |
|---|---|---|---|
| 2,949,283 | 8/1960 | Smith | 165—32 |
| 3,075,360 | 1/1963 | Elfving et al. | 62—3 |
| 3,177,933 | 4/1965 | Webb | 165—96 |
| 3,225,820 | 12/1965 | Riordan | 165—32 X |
| 3,225,820 | 12/1965 | Riordan | 165—32 X |

UNITED STATES PATENTS

| | | |
|---|---|---|
| 659,585 | 3/1963 | Canada. |

ROBERT A. O'LEARY, Primary Examiner

ALBERT W. DAVIS, Jr., Assistant Examiner

U.S. Cl. X.R.

136—161; 165—135, 185; 244—1